(12) United States Patent
Chen

(10) Patent No.: US 11,300,867 B2
(45) Date of Patent: Apr. 12, 2022

(54) PROJECTION APPARATUS, BACKLASH DETECTING SYSTEM AND METHOD THEREOF

(71) Applicant: Coretronic Corporation, Hsin-Chu (TW)

(72) Inventor: Chih-Chen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 549 days.

(21) Appl. No.: 16/255,836

(22) Filed: Jan. 24, 2019

(65) Prior Publication Data

US 2019/0302602 A1    Oct. 3, 2019

(30) Foreign Application Priority Data

Mar. 30, 2018  (CN) .......................... 201810295881.2

(51) Int. Cl.
   *G03B 21/53*    (2006.01)
(52) U.S. Cl.
   CPC .................................. *G03B 21/53* (2013.01)
(58) Field of Classification Search
   CPC ...... G03B 21/53; G03B 27/527; G03B 43/00; G03B 21/142; G02B 7/09; G02B 7/28
   See application file for complete search history.

(56) References Cited

U.S. PATENT DOCUMENTS

| | | | |
|---|---|---|---|
| 4,550,508 A | 11/1985 | Spaeth | |
| 5,493,163 A * | 2/1996 | Nishikawa | G02B 7/28 310/316.02 |
| 2001/0003435 A1 | 6/2001 | Okumura | |

FOREIGN PATENT DOCUMENTS

| | | |
|---|---|---|
| CN | 1105934 | 8/1995 |
| CN | 1166873 | 12/1997 |
| CN | 1661410 | 8/2005 |
| CN | 2758801 | 2/2006 |

(Continued)

OTHER PUBLICATIONS

Jun-Xing Shi, "Calculation and measurement of opening type gear's tip clearance and backlash," WISCO Technology, vol. 51, No. 4, Aug. 2013, pp. 1-4, English Abstract; No Translation of Document Filed.

(Continued)

*Primary Examiner* — Alicia M Harrington
(74) *Attorney, Agent, or Firm* — JCIPRNET

(57) ABSTRACT

A projection apparatus is provided. A gear structure and a positioning piece in the projection lens module are disposed about opposite sides outside the lens barrel. The gear structure and the positioning piece rotates around an optical axis of the lens barrel acting as a rotating axis. Moreover, when the gear structure rotates, the positioning piece rotates relative to the gear structure. A transmission gear of the motor module meshes with the gear structure to drive the gear structure to rotate. The positioning module is disposed next to the positioning piece and is configured for measuring rotation of the positioning piece to generate a positioning signal. The controller controls the motor module to drive the transmission gear, receives the positioning signal, and calculates a backlash between the transmission gear and the gear structure according to the positioning signal. A backlash detecting system and a method thereof are provided.

21 Claims, 7 Drawing Sheets

(56) References Cited

FOREIGN PATENT DOCUMENTS

| | | |
|---|---|---|
| CN | 200996835 | 12/2007 |
| CN | 101256066 | 9/2008 |
| CN | 101464133 | 6/2009 |
| CN | 201644141 | 11/2010 |
| CN | 201953950 | 8/2011 |
| CN | 102540659 | 7/2012 |
| CN | 202452931 | 9/2012 |
| CN | 102865980 | 1/2013 |
| CN | 103245319 | 8/2013 |
| CN | 103576436 | 2/2014 |
| CN | 104359380 | 2/2015 |
| CN | 104457661 | 3/2015 |
| CN | 104708496 | 6/2015 |
| CN | 104764411 | 7/2015 |
| CN | 104813153 | 7/2015 |
| CN | 105136053 | 12/2015 |
| CN | 105627971 | 6/2016 |
| CN | 106152914 | 11/2016 |
| CN | 106597781 | 4/2017 |
| CN | 206944971 | 1/2018 |
| JP | H0342510 | 2/1991 |
| JP | 6333228 | 5/2018 |
| TW | 311207 | 7/1997 |

OTHER PUBLICATIONS

"Office Action of China Counterpart Application", dated Nov. 3, 2020, p. 1-p. 7.

* cited by examiner

PROJECTION APPARATUS, BACKLASH DETECTING SYSTEM AND METHOD THEREOF

CROSS-REFERENCE TO RELATED APPLICATION

This application claims the priority benefit of China application serial no. 201810295881.2, filed on Mar. 30, 2018. The entirety of the above-mentioned patent application is hereby incorporated by reference herein and made a part of this specification.

BACKGROUND

Technical Field

The invention relates to a backlash detecting technology for gear system. More particularly, the invention relates to a projection apparatus having a backlash detecting system, a backlash detecting system, and a method thereof.

Description of Related Art

Nowadays, rotation driven by gears is a widely-used transmission technology. More particularly, in technologies applied in robotic manipulator control, projection apparatuses, and the like, the stepper motor is used to drive the entire gear system to control movement of the elements. For instance, in a projection apparatus, a stepper motor is used most of the time to control a gear system to perform aperture size control or projection lens focusing, etc.

In a typical gear system, a clearance is required to be retained between the pitches and tooth thicknesses of the teeth of the gears meshing with each other, so that the gears are not jammed during rotation. This clearance is called lash or backlash. When a gear rotates, the rotation of the gear may drive the elements to be deviated from the predetermined position as affected by the backlash, and deviation thus occurs. In existing technology, the pitches and tooth thicknesses are used to calculate the backlash when the gear is shipped, or the backlash is measured by using precision measurement instrument for calibrating the deviation of the elements after the gear system is assembled. Nevertheless, an additional measuring procedure is thus required during the manufacturing process if precision measurement instrument is to be used, and different sizes of backlash may be generated when the rotation direction of the gear changes. In addition, wear is generated after the gear is operated for a long period of time, which may lead to changes in the backlash. As a result, the foregoing calibration may not be performed accurately, and that the gear system cannot accurately control movement of the elements.

Taking a projection apparatus for example, when the projection lens autofocus is performed, if the actual position of the lens element is slightly deviated from the desirable position, problems such as inaccurate focusing and blurred images may occur. Therefore, an accurate and convenient backlash detecting method is crucial in the application of stepper motors requiring precise control.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection apparatus, a backlash detecting system, and a method thereof in which a simple structure is provided and measurement is conveniently performed, and moreover, backlash of a gear system at a moment may be calculated at any time and backlash generated by different rotation directions may be detected.

Other objects and advantages of the disclosure may be understood from the technical features of the invention.

For one or some or all of the aforementioned objects or for other objects, in an embodiment of the invention, a projection apparatus is provided, which includes a projection lens module, a motor module, a positioning module, and a controller. The projection lens module includes a lens barrel, a positioning piece, a gear structure, and an optical lens set. The gear structure and the positioning piece are disposed about opposite sides outside the lens barrel. The gear structure and the positioning piece rotates around an optical axis of the lens barrel acting as a rotating axis. An optical lens set is disposed in the lens barrel. When the gear structure rotates, the optical lens set correspondingly moves along the optical axis, and the positioning piece rotates relative to the gear structure. The motor module includes a transmission gear, wherein the transmission gear meshes with the gear structure to drive the gear structure to rotate. The positioning module is disposed next to the positioning piece and is configured for measuring rotation of the positioning piece to generate a positioning signal. The controller is electrically connected to the motor module and the positioning module. The controller controls the motor module to drive the transmission gear, receives the positioning signal, and calculates backlash between the transmission gear and the gear structure according to the positioning signal.

In an embodiment of the invention, a backlash detecting system includes a gear structure, a positioning piece, a motor module, a positioning module, and a controller. The motor module includes a transmission gear, wherein the transmission gear meshes with the gear structure to drive the gear structure to rotate. A surface of the positioning piece has a plurality of blocking pieces disposed corresponding to the gear structure and moving or rotating along with rotation of the gear structure. The positioning module is disposed next to the positioning piece and is configured for measuring rotation or movement of the positioning piece to generate a positioning signal. The controller is electrically connected to the motor module and the positioning module. The controller controls the motor module to drive the transmission gear, receives the positioning signal, and calculates backlash between the transmission gear and the gear structure.

In an embodiment of the invention, a backlash detecting method is configured for a backlash detecting system. The backlash detecting system includes a gear structure, a transmission gear meshing with the gear structure, a positioning piece disposed correspondingly to the gear structure and having a plurality of blocking pieces, and a positioning module disposed next to the positioning pieces. The backlash detecting method includes the following steps. The gear structure is driven by the transmission gear to rotate in a first direction. The positioning piece is moved or rotated along with rotation of the gear structure. Rotation or movement of the positioning piece is measured by the positioning module so as to generate a positioning signal. A level of the positioning signal is compared with a reference threshold so as to determine whether the positioning signal is in a first state or in a second state. The transmission gear is controlled to enable the rotation direction of the gear structure to change from the first direction to the second direction and counting is begun when the state of the positioning signal is determined to be changed. Counting is stopped and the backlash corresponding to the second direction is generated according to a current counting result when the state of the positioning signal is changed again.

To sum up, in the projection apparatus, the backlash detecting system, and a method thereof provided by the embodiments of the invention, a simple structure is provided and may be integrated with an original gear system structure. Additional precision measurement instrument is not required to detect the backlash. Moreover, the backlash at the moment may be calculated at any time, and the backlash may be instantaneously calibrated. Even though the gear structure and the transmission gear are used for a period of time, or even wear is generated, the current backlash may still be detected. Further, the backlash generated after the rotation direction is changed can be calculated, and positioning accuracy is thereby significantly enhanced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. The language used to describe the directions such as up, down, left, right, front, back or the like in the following embodiment is regarded in an illustrative rather than in a restrictive sense. As such, the directional terminology is used for purposes of illustration and is in no way limiting.

Figure 1:
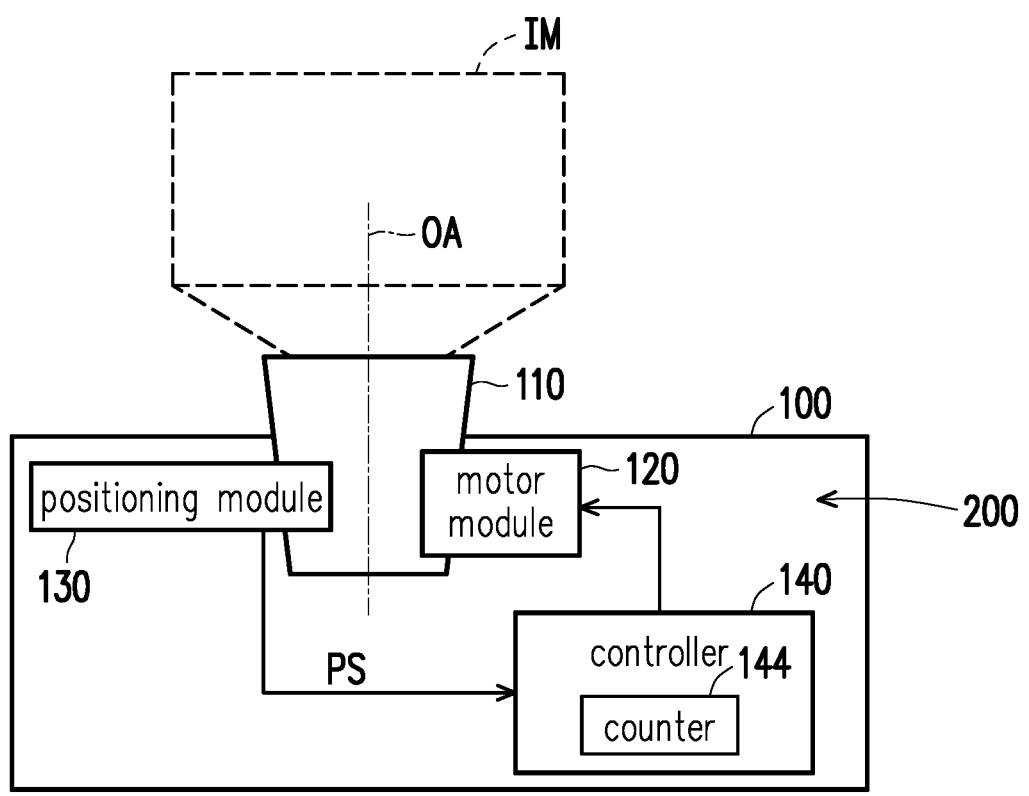
FIG. 1 is a schematic view of a projection apparatus according to an embodiment of the invention.
Figure 2:
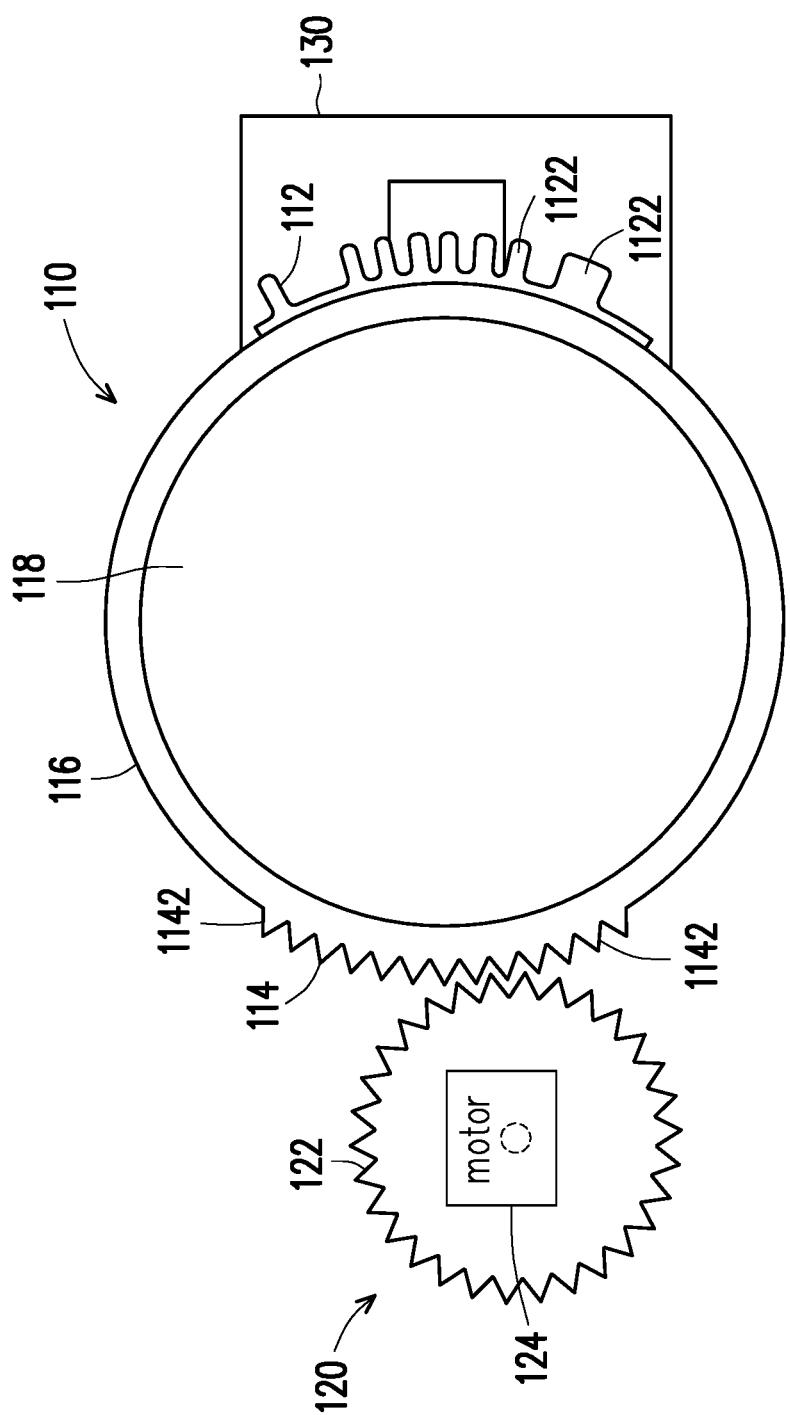
FIG. 2 is a schematic view of a portion of the projection apparatus according to an embodiment of the invention.

FIG. 1 is a schematic view of a projection apparatus according to an embodiment of the invention, and FIG. 2 is a schematic view of a portion of the projection apparatus according to an embodiment of the invention. With reference to FIG. 1 to FIG. 2, a projection apparatus 100 includes a projection lens module 110, a motor module 120, a positioning module 130, and a controller 140. The projection apparatus 100 projects an image IM through the projection lens module 110.

The projection lens module 110 includes a positioning piece 112, a gear structure 114, a lens barrel 116, and an optical lens set 118. The optical lens set 118 includes a single or a plurality of lenses, but is not limited thereto. The optical lens set 118 is disposed in the lens barrel 116. The gear structure 114 and the positioning piece 112 are disposed about opposite sides outside the lens barrel 116 and rotate around an optical axis OA of the lens barrel acting as a rotation axis. The motor module 120 includes a transmission gear 122 and a motor 124. The controller 140 is electrically connected to the motor module 120 and the positioning module 130, and the controller 140 is configured for controlling the motor 124 of the motor module 120 to rotate, so as to drive the transmission gear 122.

The transmission gear 122 meshes with the gear structure 114 to drive the gear structure 114 to rotate. When the gear structure 114 rotates, the optical lens set 118 correspondingly moves along the optical axis OA of the lens barrel 116, and the positioning piece 112 rotates relative to the gear structure 114 in a same direction (e.g., rotates in a counterclockwise direction). The positioning module 130 is disposed next to the positioning piece 112 and is configured for measuring rotation of the positioning piece 112 to generate a positioning signal PS. The controller 140 receives the positioning signal PS and calculates backlash between the transmission gear 122 and the gear structure 114 according to the positioning signal PS.

Besides, in another aspect, the projection apparatus 100 in this embodiment may be regarded as an apparatus including a backlash detecting system 200. The backlash detecting system 200 includes the gear structure 114, the positioning piece 112, the motor module 120, the transmission gear 122, the positioning module 130, and the controller 140.

Specifically, the gear structure 114 is, for example, a gear ring or a gear rack and includes a plurality of teeth 1142, and the positioning piece 112 is, for example, a positioning ring, and a surface of the positioning piece 112 has a plurality of protruding blocking pieces 1122. The gear structure 114 and the positioning piece 112 are disposed on the lens barrel 16, as such, the positioning piece 112 is correspondingly driven to rotate when the gear structure 114 rotates. In this embodiment, shapes, numbers, and size ratios of the teeth 1142 and the blocking pieces 1122 are merely exemplary and are not used to limit the invention. In addition, the shapes and widths of the blocking pieces 1122 may not be the same, gaps between the blocking pieces 1122 may not be the same, and suitable design may be made by people having ordinary skill in the art according to actual requirement.

The motor (an electrical machine motor) 124 is, for example, a stepper motor. The controller 140 is a hardware device such as a central processing unit (CPU), a microprocessor, an application specific integrated circuit (ASIC), or a programmable logic device (PLD).

Figure 3:
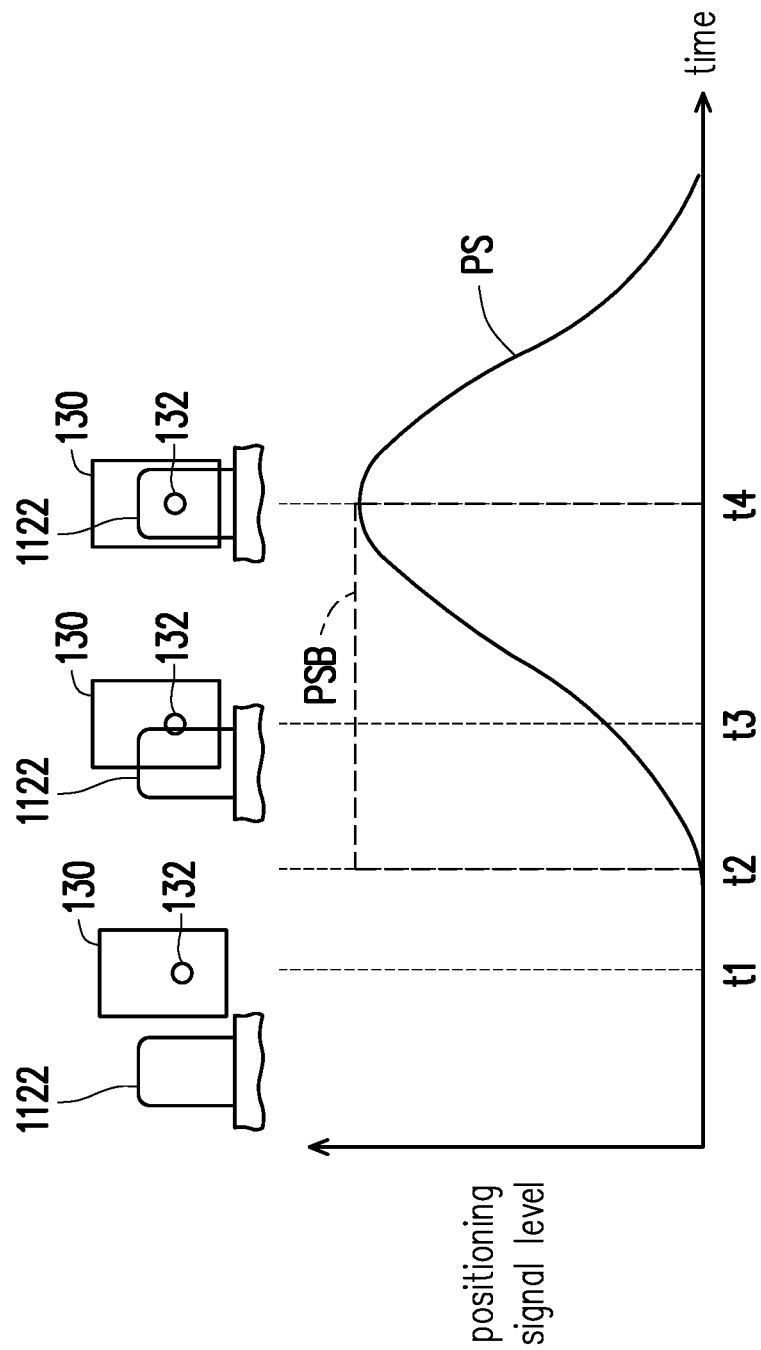
FIG. 3 is a schematic graph of a detection state of a positioning signal according to an embodiment of the invention.

FIG. 3 is a schematic graph of a detection state of a positioning signal according to an embodiment of the invention. The positioning module 130 is, for example, a photointerrupter, and the positioning module 130 has two ends, wherein one end may emit a light ray 132, and the other end receives the light ray 132. When the blocking pieces 1122 pass through the two ends, the light ray 132 is blocked by the blocking pieces 1122, and that the positioning module 130 generates the positioning signal PS changing correspondingly. In the embodiment of FIG. 3, a direction of an emission path of the light ray 132 is perpendicular to a paper surface, and one of the blocking pieces 1122 of the positioning piece 112 passes through the path of the light ray 132 of the positioning module 130 from left to right. At a time point t1, the blocking piece 1122 does not meet the light ray 132 yet, and the positioning signal PS is in a low-level state. A level of the positioning signal PS may refer to a voltage level or a current level, but is not limited thereto. At a time point t2, the blocking piece 1122 begins to be in contact with the light ray 132, and the level of the positioning signal PS begins to change. At a time point t3, the blocking piece 1122 blocks a portion of the light ray 132, and the level of the positioning signal PS rises. At a time point t4, the blocking piece 1122 completely blocks the light ray 132, and the positioning signal PS is at a high-level state. At this time, state changes between the low-level state and the high-level state of the positioning signal PS is called a transition, and a level change of the positioning signal PS between the time point t2 and the time point t4 is called a signal transition edge section PSB. The controller 140 receives the positioning signal PS and determines that whether the projection lens module 110 is driven by the motor module 120 according to the level change of the positioning signal PS.

Note that in this embodiment, widths and gaps of and between the blocking pieces 1122 of the positioning piece 112 are at least 1.5 times greater than tooth thicknesses and pitches of the teeth 1142 and teeth of the transmission gear 122. In this case, during the two transitions caused by the positioning piece 112, a sufficient number of teeth are moved by the gear structure 114.

Figure 4:
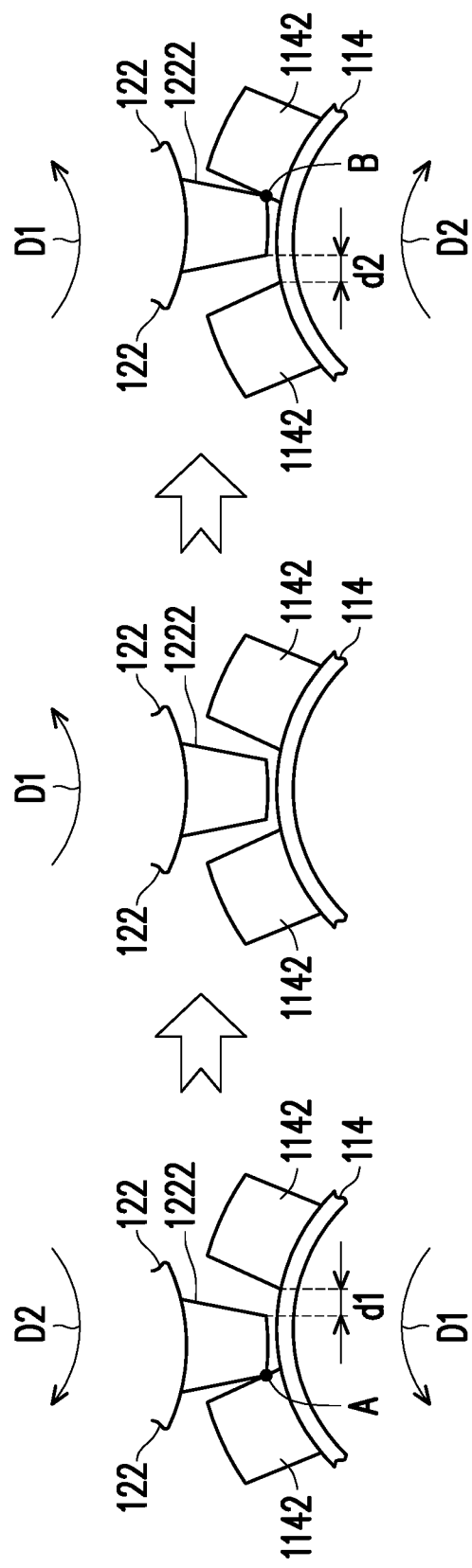
FIG. 4A to FIG. 4C are schematic views of states of changes in rotation directions of the transmission gear and the gear structure according to an embodiment of the invention.

FIG. 4A to FIG. 4C are schematic views of states of changes in rotation directions of the transmission gear and the gear structure according to an embodiment of the invention. The transmission gear 122 has a plurality of teeth 1222. One of the teeth 1222 meshes between two adjacent teeth 1142 of the gear structure 114 to drive the gear structure 114 to rotate. A clearance in which the tooth 1222 meshes between the two teeth 1142 is called backlash. In other embodiments, it may be one tooth 1142 of the gear structure 114 meshes between two teeth 1222 of the transmission gear 122.

In FIG. 4A, the transmission gear 122 rotates in a clockwise direction D2 to drive the gear structure 114 to rotate in a counter-clockwise direction D1, and a contact point A and a backlash d1 exist between the tooth 1222 and the teeth 1142. In FIG. 4B, the transmission gear 122 changes the rotation direction and rotates in the counter-clockwise direction D1. After the tooth 1222 leaves the contact point A and before the tooth 1222 is in contact with the other tooth 1142 of the gear structure 114, such stagnation period is called idle rotation. At this time, the gear structure 114 is not driven by the transmission gear 122, and that the positioning piece 112 and the optical lens set 118 are not driven either. Next, in FIG. 4C, only after the transmission gear 122 is in contact with the other tooth 1142 and a contact point B and a backlash d2 are generated does the transmission gear 122 be able to drive the gear structure 114 to rotate in the clockwise direction D2.

Figure 5:
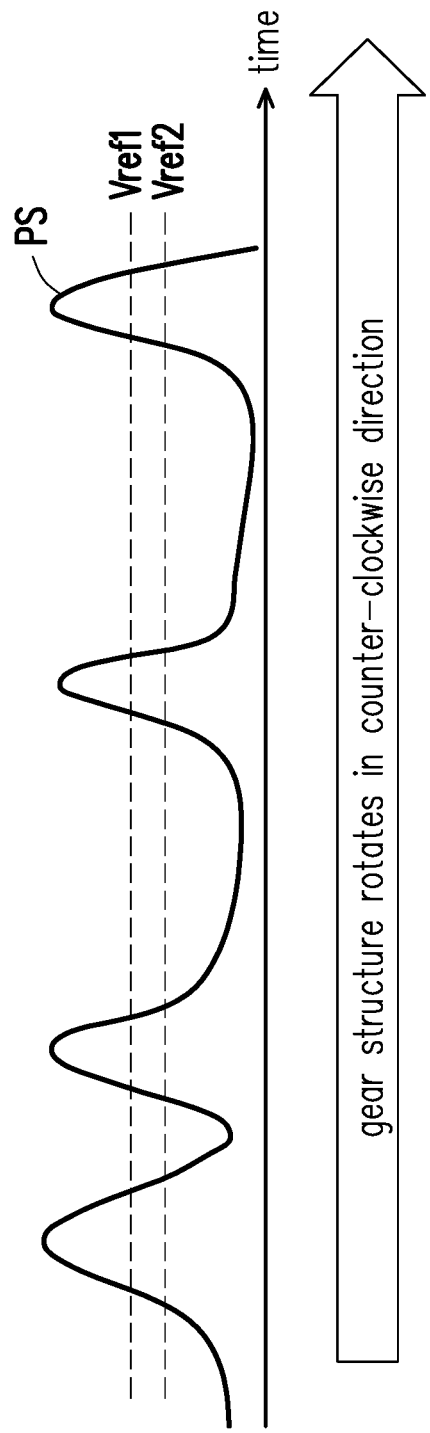
FIG. 5 is a schematic graph of changes of a positioning signal over time when a gear structure rotates in a fixed direction according to an embodiment of the invention.

FIG. 5 is a schematic graph of changes of a positioning signal over time when a gear structure rotates in a fixed direction according to an embodiment of the invention. The controller 140 may compare a level of the positioning signal PS with a reference threshold, so as to determine whether the positioning signal PS is in the high-level state (referred to as "a first state" hereinafter) or the low-level state (referred to as "a second state" hereinafter). The reference threshold may be one value or a plurality of values and may be a fixed default value or an adjustable threshold and is not limited by the invention.

In this embodiment, the reference threshold includes, for example, a first threshold Vref1 and a second threshold Vref2, and the first threshold Vref1 is greater than the second threshold Vref2. For instance, the first threshold Vref1 is, for example, 2.2V (volt), and the second threshold Vref2 is 1.8V (volt). The controller 140 determines that the positioning signal PS is in the first state when a voltage level of the positioning signal PS is greater than the first threshold Vref1 and determines that the positioning signal PS is in the second state when the level of the positioning signal PS is lower than the second threshold Vref2.

Since the gear structure 114 continues to rotate in the counter-clockwise direction, the positioning piece 112 rotates in the fixed direction, and each of the blocking pieces 1122 successively passes through the path of the light ray 132 in the positioning module 130. The transition thus correspondingly occurs to the positioning signal PS, and widths and the gaps of the blocking pieces 1122 determine a bandwidth of the positioning signal PS and time intervals of the transition.

Specific embodiments of a backlash detecting process are further described in detail as follows.

Figure 6:
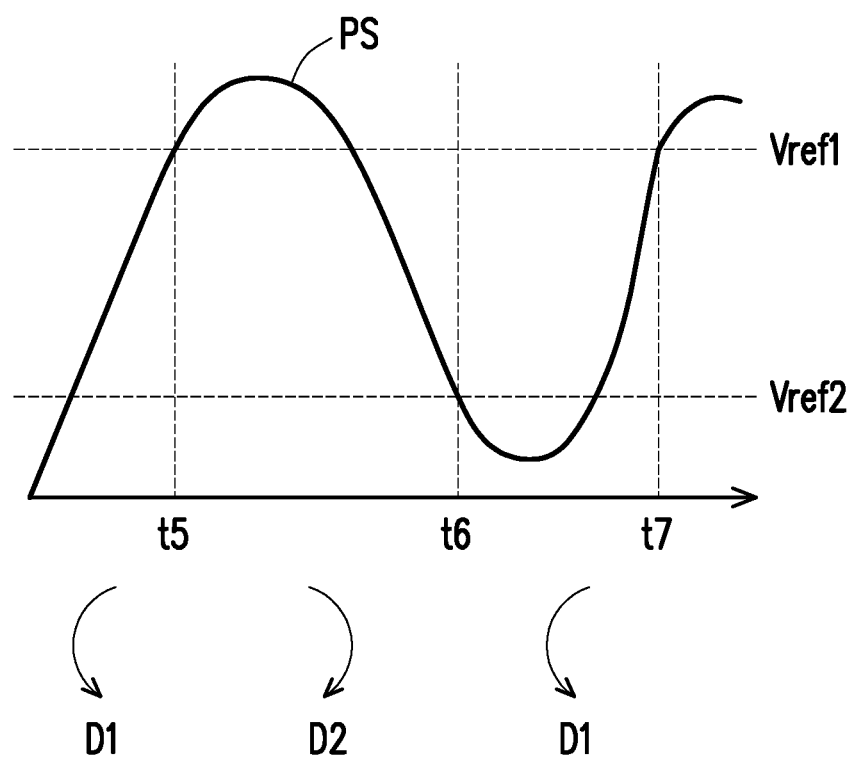
FIG. 6 is a schematic graph of changes of a positioning signal in a backlash detecting process according to an embodiment of the invention.

FIG. 6 is a schematic graph of changes of a positioning signal in a backlash detecting process according to an embodiment of the invention. At the beginning, the controller 140 controls the motor 124 to drive the transmission gear 122 to rotate in the clockwise direction D2, so as to drive the gear structure 114 to rotate in the counter-clockwise direction D1 and instantaneously receive the positioning signal PS, as shown by the time points before a time point t5. The controller 140 includes a counter 144. At the time point t5, when the controller 140 determines that the transition occurs to the positioning signal PS (changing from the second state to the first state), that is, one of the blocking pieces 1122 blocks the light ray 132, the counter 144 begins counting. Moreover, the controller 140 controls the transmission gear 122 of the motor module 120 to enable the rotation direction of the gear structure 114 to change from the counter-clockwise direction D1 to the clockwise direction D2. Next, at a time point t6, when the controller 140 determines that the positioning signal PS is changed back to the second state again from the first state, the counter 144 stops counting. The controller 140 generates the backlash d2 corresponding to the clockwise direction D2 according to a current counting result (the counting between the time point t5 and the time point t6).

After the backlash d2 in the clockwise direction D2 is detected, the backlash detecting system 200 may further detect the backlash d1 in the counter-clockwise direction D1. How to detect backlash in different rotation directions is described as follows.

At the time point t6, the counter 144 re-starts counting, and the controller 140 controls the transmission gear 122 to enable the rotation direction of the gear structure 114 to change back to the counter-clockwise direction D1 again from the clockwise direction D2.

At a time point t7, when the gear structure 114 rotates in the counter-clockwise direction D1 and the controller 140 determines that the state of the positioning signal PS is changed from the second state to the first state, the counter 144 stops counting. The controller 140 generates the backlash d1 corresponding to the counter-clockwise direction D1 according to a current counting result (the counting between the time point t6 and the time point t7).

At this point, a set of backlash measurement result for one blocking piece 1122 is calculated by the backlash detecting system 200, including the backlash d1 in the counter-clockwise direction D1 and the backlash d2 in the clockwise direction D2. After the time point t7, the gear structure 114 continues to rotate in the counter-clockwise direction D1, and the next blocking piece 1122 of the positioning piece 112 begins to pass the positioning module 130, as shown in FIG. 5. In this case, the controller 140 may calculate the next set of backlash corresponding to the counter-clockwise direction D1 and the clockwise direction D2.

To be specific, after obtaining one set of backlash, the controller 140 may further determine whether all transitions caused by all of the blocking pieces 1122 are calculated or determine whether sufficient backlash measuring counts are obtained. If not, the controller 140 continues to count the next set of backlash, and if yes, the controller 140 calculates an average value of the multiple sets of backlash obtained. The average value acts as average backlash between the transmission gear 122 and the gear structure 114. In this embodiment, the controller 140 may obtain at least one set of backlash for each of the blocking pieces 1122, and the average value measuring the backlash of all of the blocking pieces 1122 acts as the average backlash between the transmission gear 122 and the gear structure 114.

In another embodiment, the backlash detecting system of this embodiment may be applied to apparatuses having a gear structure meshing with another gear structure and is not limited to be applied to a projection apparatus only. The positioning piece 112 is not limited to be ring-shaped only and may be shaped as a strip or in other shapes. In addition, the positioning piece 112 and the gear structure 114 are not limited to be disposed on the lens barrel 116 or to be disposed on common base element. The positioning piece 112 and the gear structure 114 may be coupled to each other through other gears or transmission mechanisms, as long as the positioning piece 112 is correspondingly disposed to the gear structure 114, and that the positioning piece 112 may be driven by the gear structure 114 to generate the corresponding rotation or movement. The positioning module 130 measures the movement or rotation of the positioning piece 112 to generate the positioning signal PS. People having ordinary skill in the art may acquire sufficient teachings and suggestions based on the foregoing description and common knowledge in the art and make appropriate adjustment according to actual applications.

Figure 7:
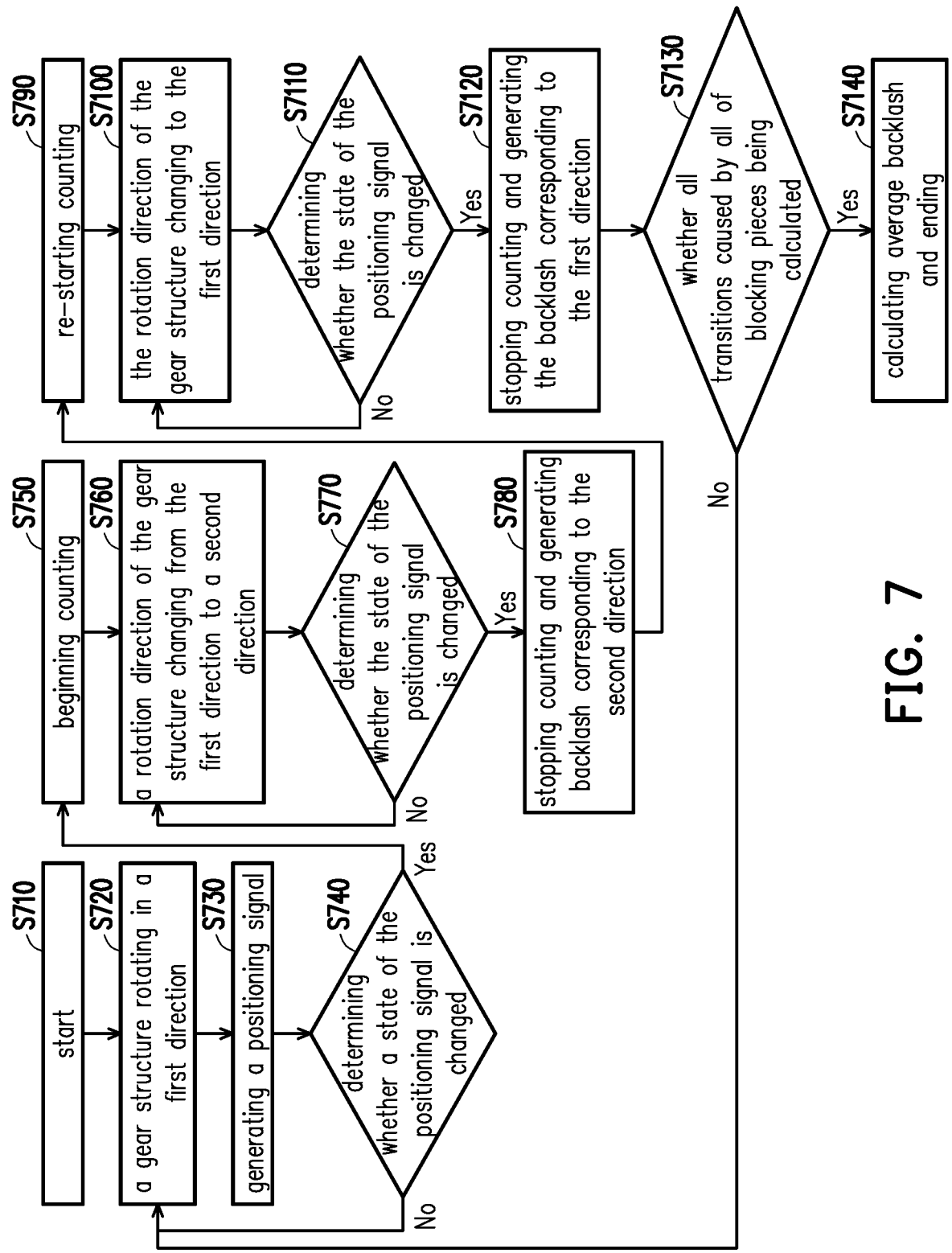
FIG. 7 is a flowchart of a backlash detecting method according to an embodiment of the invention.

FIG. 7 is a flowchart of a backlash detecting method according to an embodiment of the invention. The backlash detecting method of this embodiment may be applied to the backlash detecting system 200 of FIG. 1 and FIG. 2, and steps of this method are described in detail with reference to the various elements of FIG. 1 and FIG. 2.

The backlash detecting steps start from step S710. In step S720, the gear structure 114 is driven by the transmission gear 122 to rotate in the first direction (e.g., the counter-clockwise direction), and the positioning piece 112 is moved or rotated along with rotation of the gear structure 114. In step S730, the positioning module 130 measures the rotation or movement of the positioning piece 112 to generate the positioning signal PS. Next, in step S740, the controller 140 may compare the level of the positioning signal PS with the reference threshold (e.g., the first threshold Vref1 and the second threshold Vref2), so as to determine whether the positioning signal PS is in the first state or the second state and to determine whether the state is changed. If the state of the positioning signal PS is not changed, step S720 is performed again, and the gear structure 114 continues to rotate in the first direction. If the state of the positioning signal PS is changed, step S750 is performed, and the counter 144 of the controller 140 begins counting. Further, in step S760, the controller 140 controls the transmission gear 122 to enable the rotation direction of the gear structure 114 to change from the first direction to the second direction (e.g., the clockwise direction).

In step S770, the controller 140 continues to receive the positioning signal PS and determines whether the state of the positioning signal PS is changed. If the state is not changed, step S760 is performed again, and the gear structure 114 continues to rotate in the second direction. If it is determined that the state of the positioning signal PS is changed again, step S780 is performed. The counter 144 stops counting, and the controller 140 generates the backlash corresponding to the second direction according to the current counting result.

Step S790 may be performed next if the backlash detecting system 200 is to further detect the backlash in the first direction, and the counter 144 may re-start counting after being reset to zero. In step S7100, the controller 140 controls the transmission gear 122 to enable the rotation direction of the gear structure 114 to change from the second direction to the first direction.

Note that step S750 and step S760 and step S790 and step S7100 are not limited by the invention. In terms of performance sequence of the two sets of steps, step S750 and step S760 and step S790 and step S7100 may be performed simultaneously or may be performed in reverse sequence.

In step S7110, the controller 140 determines that whether the state of the positioning signal PS is changed again. If the state is not changed, step S7100 is performed again. If it is determined that the state of the positioning signal PS is changed again, step S7120 is performed, and the counter 144 stops counting, and the controller 140 generates the backlash corresponding to the first direction according to the current counting result.

After performing step S710 to step S7120, one set of backlash including the first direction and the second direction is calculated by the backlash detecting system 200. Next, after step S7120, the gear structure 114 continues to rotate in the first direction, and the next blocking piece 1122 of the positioning piece 112 may begin to pass the positioning module 130, as such, a transition occurs to the positioning signal PS again. In this way, the controller 140 may calculates the next set of backlash in the first direction and the second direction. In step S7130, the controller 140 may further determine whether all transitions of all of the blocking pieces 1122 are calculated. If not, step S720 is performed again, and the controller 140 continues to calculate the next set of backlash. If yes, step S7140 is performed, and the controller 140 calculates the average value of multiple sets of backlash obtained for the blocking pieces 1122. The average value acts as the average backlash between the transmission gear 122 and the gear structure 114.

People having ordinary skill in the art may acquire sufficient teachings, suggestions, and implementation illustration related to the detailed steps and specific implementation of the backlash detecting method of FIG. 7 based on the description of FIG. 1 to FIG. 6 as well as common knowledge in the art, and that detailed descriptions are not further provided hereinafter.

In view of the foregoing, in the projection apparatus, the backlash detecting system, and the method thereof are provided by the embodiments of the invention, as the transmission gear meshes with the gear to drive the gear to rotate and the positioning piece is correspondingly disposed to the gear, the positioning piece may move or rotate corresponding to the rotation of the gear. The positioning module is disposed next to the positioning piece and is configured to detect the movement or rotation of the positioning piece to generate the positioning signal. The controller receives the positioning signal and determines whether a transition occurs to the positioning signal. When a transition occurs, the controller changes the rotation direction of the gear and begins counting. When another transition occurs to the positioning signal again, the controller stops counting and calculates the backlash between the transmission gear and the gear according to the counting result of the idle rotation between the two transitions. In this way, in the projection apparatus, the backlash detecting system, and method thereof provided by the embodiments of the invention, a simple structure is provided, the backlash of different rotation directions is calculated, a backlash value at the moment may be calculated at any time, backlash is instantaneously calibrated, and accuracy is therefore enhanced.

The above are exemplary embodiments of the disclosure and should not be construed as limitations to the scope of the disclosure. That is, any simple change or modification made based on disclosure of the claims and specification of the disclosure falls within the scope of the disclosure. Any of the embodiments or any of the claims of the disclosure does not necessarily achieve all of the advantages or features disclosed by the disclosure. Moreover, the abstract and the title of the disclosure are merely used to aid in search of patent files and are not intended to limit the scope of the disclosure. In addition, terms such as "first" and "second" in the specification or claims are used only to name the elements or to distinguish different embodiments or scopes and should not be construed as the upper limit or lower limit of the number of any element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A projection apparatus, comprising:
    a projection lens module, comprising:
        a lens barrel;
        a positioning piece, having a plurality of blocking pieces protruding on a circumference of the positioning piece; and
        a gear structure, wherein the gear structure and the positioning piece are disposed on the lens barrel and located on different sides of the lens barrel with respect to an optical axis of the lens barrel, wherein the gear structure and the positioning piece are configured to rotate around the optical axis of the lens barrel, the optical axis of the lens barrel acts as a revolution axis of the gear structure and the positioning piece, and the positioning piece rotates about the optical axis of the lens barrel when the gear structure rotates;
    a motor module, comprising a transmission gear, wherein the transmission gear meshes with the gear structure to drive the gear structure to rotate;
    a positioning module, disposed next to the positioning piece and configured for measuring rotation of the positioning piece to generate a positioning signal; and
    a controller, electrically connected to the motor module and the positioning module, the controller controlling the motor module to drive the transmission gear, receiving the positioning signal, and calculating a backlash between the transmission gear and the gear structure.

2. The projection apparatus of claim 1, wherein the controller compares a level of the positioning signal with a reference threshold so as to determine whether the positioning signal is in a first state or in a second state, and
    the controller controls the transmission gear of the motor module to enable a rotation direction of the gear structure to change from a first direction to a second direction, and the controller begins counting when the gear structure rotates in the first direction and the controller receives the positioning signal and determines that a state of the positioning signal is changed.

3. The projection apparatus of claim 2, wherein the reference threshold comprises a first threshold and a second threshold, and the first threshold is greater than the second threshold, and
    the controller determines that the positioning signal is in the first state when the level of the positioning signal is greater than the first threshold, and the controller determines that the positioning signal is in the second state when the level of the positioning signal is lower than the second threshold.

4. The projection apparatus of claim 2, wherein the controller stops counting and generates the backlash corresponding to the second direction according to a current counting result when the controller determines that the state of the positioning signal is changed again.

5. The projection apparatus of claim 4, wherein the controller controls the motor module to enable the rotation direction of the gear structure to change from the second direction to the first direction and re-starts counting.

6. The projection apparatus of claim 5, wherein the controller stops counting and generates the backlash corresponding to the first direction according to a current counting result when the controller determines that the state of the positioning signal is changed after the rotation direction of the gear structure is changed to the first direction.

7. The projection apparatus of claim 1, wherein the controller obtains at least one set of the backlash for each of the blocking pieces, and a backlash average value of the blocking pieces act as average backlash between the transmission gear and the gear structure.

8. The projection apparatus of claim 1, wherein one of the gear structure and the transmission gear has a plurality of first teeth, the other one of the gear structure and the transmission gear has a plurality of second teeth, the backlash refers to a clearance in which one of the teeth of the first teeth meshes between two adjacent second teeth of the second teeth.

9. The projection apparatus of claim 7, wherein widths of the blocking pieces are not the same, and gaps between the blocking pieces are not the same.

10. The projection apparatus of claim 1, wherein the positioning module comprises a photointerrupter.

11. A backlash detecting system for a lens barrel, comprising:
a gear structure;
a motor module, comprising a transmission gear, wherein the transmission gear meshes with the gear structure to drive the gear structure to rotate;
a positioning piece, having a plurality of blocking pieces protruding on a circumference of the positioning piece, wherein the positioning piece and the gear structure are disposed on the lens barrel and located on different sides of the lens barrel with respect to an optical axis of the lens barrel, wherein the gear structure and the positioning piece are configured to rotate around the optical axis of the lens barrel, and the optical axis of the lens barrel acts as a revolution axis of the gear structure and the positioning piece;
a positioning module, disposed next to the positioning piece and configured for measuring rotation or movement of the positioning piece to generate a positioning signal; and
a controller, electrically connected to the motor module and the positioning module, the controller controlling the motor module to drive the transmission gear, receiving the positioning signal, and calculating a backlash between the transmission gear and the gear structure.

12. The backlash detecting system of claim 11, wherein the controller compares a level of the positioning signal with a reference threshold so as to determine whether the positioning signal is in a first state or in a second state; and the controller controls the transmission gear of the motor module to enable a rotation direction of the gear structure to change from a first direction to a second direction, and the controller begins counting when the gear structure rotates in the first direction and the controller receives the positioning signal and determines that a state of the positioning signal is changed.

13. The backlash detecting system of claim 12, wherein the reference threshold comprises a first threshold and a second threshold, and the first threshold is greater than the second threshold; and
the controller determines that the positioning signal is in the first state when the level of the positioning signal is greater than the first threshold, and the controller determines that the positioning signal is in the second state when the level of the positioning signal is lower than the second threshold.

14. The backlash detecting system of claim 12, wherein the controller stops counting and generates the backlash corresponding to the second direction according to a current counting result when the controller determines that the state of the positioning signal is changed again.

15. The backlash detecting system of claim 14, wherein the controller controls the motor module to enable the rotation direction of the gear structure to change from the second direction to the first direction and re-starts counting.

16. The backlash detecting system of claim 15, wherein the controller stops counting and generates the backlash corresponding to the first direction according to a current counting result when the controller determines that the state of the positioning signal is changed after the rotation direction of the gear structure is changed to the first direction.

17. The backlash detecting system of claim 11, wherein the controller obtains at least one set of the backlash for each of the blocking pieces, and a backlash average value of the blocking pieces act as average backlash between the transmission gear and the gear structure.

18. The backlash detecting system of claim 11, wherein one of the gear structure and the transmission gear has a plurality of first teeth, the other one of the gear structure and the transmission gear has a plurality of second teeth, the backlash refers to a clearance in which one of the teeth of the first teeth meshes between two adjacent second teeth of the second teeth.

19. The backlash detecting system of claim 11, wherein the positioning module comprises a photointerrupter.

20. A backlash detecting method, configured for a backlash detecting system applied to a lens barrel, wherein the backlash detecting system comprises a gear structure, a transmission gear meshing with the gear structure, and a positioning module disposed next to a positioning piece, and the backlash detecting method comprises:
driving the gear structure by the transmission gear to rotate in a first direction, the positioning piece being moved or rotated with rotation of the gear structure, wherein the gear structure and the positioning piece are disposed on the lens barrel and located on different sides of the lens barrel with respect to an optical axis of the lens barrel, wherein the gear structure and the positioning piece are configured to rotate around the optical axis of the lens barrel, and the optical axis of the lens barrel acts as a revolution axis of the gear structure and the positioning piece;
measuring rotation or movement of the positioning piece by the positioning module so as to generate a positioning signal;

comparing a level of the positioning signal with a reference threshold so as to determine whether the positioning signal is in a first state or in a second state;

controlling the transmission gear to enable the rotation direction of the gear structure to change from the first direction to the second direction and beginning counting when the state of the positioning signal is determined to be changed; and stopping counting and generating the backlash corresponding to the second direction according to a current counting result when the state of the positioning signal is changed again.

21. The backlash detecting method of claim 20, wherein the step of stopping counting and generating the backlash corresponding to the second direction according to the current counting result when the state of the positioning signal is changed again further comprises:

enabling the rotation direction of the gear structure to change from the second direction to the first direction and re-starting counting; and stopping counting and generating the backlash corresponding to the first direction according to a current counting result when the state of the positioning signal is determined to be changed after the rotation direction of the gear structure is changed to the first direction.

* * * * *